(12) United States Patent
Banner

(10) Patent No.: US 9,041,960 B2
(45) Date of Patent: May 26, 2015

(54) SCHEDULING FOR DIGITAL COMMERCIAL PRINT WORKFLOWS

(75) Inventor: Ron Banner, Yokneam (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/885,978

(22) PCT Filed: Mar. 18, 2011

(86) PCT No.: PCT/US2011/029066
§ 371 (c)(1),
(2), (4) Date: May 16, 2013

(87) PCT Pub. No.: WO2012/128746
PCT Pub. Date: Sep. 27, 2012

(65) Prior Publication Data
US 2014/0002854 A1   Jan. 2, 2014

(51) Int. Cl.
*G06F 3/12* (2006.01)
*G06K 15/00* (2006.01)

(52) U.S. Cl.
CPC ............ *G06F 3/1296* (2013.01); *G06F 3/1204* (2013.01); *G06F 3/126* (2013.01); *G06F 3/1264* (2013.01); *G06F 3/1275* (2013.01); *G06F 3/1285* (2013.01)

(58) Field of Classification Search
CPC .............................. G06F 3/1275; G06F 3/1264
See application file for complete search history.

(56) References Cited

U.S. PATENT DOCUMENTS

| 5,890,134 A | 3/1999 | Fox |
| 6,805,502 B2 * | 10/2004 | Rai et al. ................. 400/61 |
| 7,051,325 B2 | 5/2006 | Choi et al. |
| 7,079,266 B1 | 7/2006 | Rai et al. |
| 8,730,503 B2 * | 5/2014 | Gross et al. .............. 358/1.15 |
| 2001/0046068 A1 | 11/2001 | Honda |
| 2007/0092323 A1 * | 4/2007 | Lin et al. ................. 400/61 |
| 2008/0313635 A1 | 12/2008 | Rai |
| 2009/0043628 A1 | 2/2009 | Gombert |
| 2009/0185212 A1 | 7/2009 | Gustafson et al. |
| 2009/0279123 A1 | 11/2009 | Sekine |
| 2010/0157326 A1 | 6/2010 | Mori |
| 2010/0245890 A1 | 9/2010 | Chakraborty |
| 2014/0160527 A1 * | 6/2014 | Banner ...................... 358/1.15 |

* cited by examiner

*Primary Examiner* — Dov Popovici
(74) *Attorney, Agent, or Firm* — Fletcher Yoder; Michael G Fletcher

(57) ABSTRACT

Systems and methods are provided for scheduling print jobs in a print service provider (PSP). In particular, embodiments include accessing a first set of data relating to processing times for a plurality of machines of a print service provider (PSP). The processing times relate to specific print jobs or types of print jobs sharing print job characteristics. In addition, embodiments include accessing a second set of data relating to setup times for the plurality of machines of the PSP. The setup times relate to specific sets of two print jobs or sets of two types of print jobs sharing print job characteristics. Further, embodiments include determining an order of processing for a plurality of print jobs based on the first and second sets of data.

12 Claims, 5 Drawing Sheets

# SCHEDULING FOR DIGITAL COMMERCIAL PRINT WORKFLOWS

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Despite the emergence of the "electronic age," there is still great demand for printed products. For example, commercial printing has annual retail sales over $700 billion. Print service providers (PSPs) fulfill the demand for printed products by printing everything from photographs and brochures, course materials, periodicals and books, to advertisements and product packaging. The customers may be individuals, groups of individuals, or organizations (non-profit, small business, corporation, and the like). The PSPs may function to process print jobs for multiple individuals, such as, the customers of a large retailer, wherein the large retailer takes orders from the individuals (e.g., for photo calendars), and submits the order as a batch of individual customer orders to the PSP.

In general, the customer creates the material to be printed, or works with a third-party provider to generate the material to be printed. The customer then submits an order including one or more materials for the PSP to print, along with one or more additional print parameters (e.g., substrate stock, number of copies, due date, any special instructions such as laminating and quality level, and shipping information). In addition, the PSP may include a number of production operations, including pre-press production, press production, and post-press production. During pre-press production, the print job is converted to the requisite format (e.g., a digital file format). Then, during press production, the print job is printed on printing machines. Then, during post-press production, the print job is finished by laminating, cutting, collating, binding, sorting/binning, packaging, and shipping. Quality Assurance (QA) may also be implemented during one or more of the production operations.

Each of the production operations may include automated processes and/or manual processes, as well as operators and their respective line managers. At each stage of the production operations, there may be multiple resources (machines, workers, etc.) that can provide the same function but with different availability, capability, and capacity. The selection and scheduling of the resources impacts the cost and lead times (time taken to fulfill an order) associated with the print job. Today, machine selection and scheduling is typically carried out by operation managers based on their experiences and intuition with respect to the particular PSP as well as the print industry in general.

DETAILED DESCRIPTION OF SPECIFIC EMBODIMENTS

Figure 1:
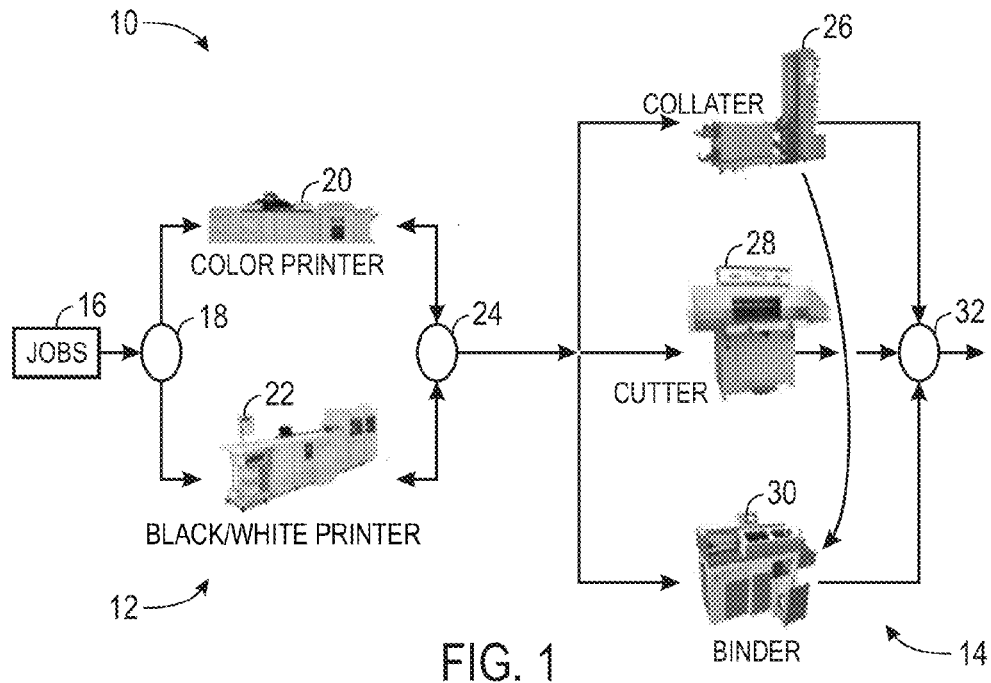
FIG. 1 is an example of a workflow of a typical PSP that may be controlled in accordance with present embodiments.

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Digital commercial print workflows typically start with the creation of digital documents (e.g., PDF files) and end with physical documents generated through print jobs. Before the actual execution of a print job, a digital workflow is created for predominantly automated execution within a print shop. Commercial printing is characterized by high variety among PSPs (print service providers) and throughout individual PSPs. In certain situations, the flow of print jobs through a given PSP may be somewhat jumbled, with frequent setups being required, such that the environment in the PSP has more of an atmosphere of project work than of a systematic manufacturing process. This poses considerable challenges and opportunities for improving the manufacturing processes of PSPs.

Plan choosing and scheduling are two basic (related) steps in the manufacturing process of PSPs. In essence, a plan choosing problem has as input a set of possible courses of actions for each print job, and a cost measure for each course of action. The output or solution to the plan choosing problem is one course of action (i.e., a path) that optimizes the overall performance according to a predefined criterion (e.g., quality, costs, deadlines, and so forth). The scheduling step furthers the plan choosing step, and includes a set of (single plan) print jobs, where each print job is a partially ordered set of tasks. In addition, the scheduling step includes a set of machines, where each machine is capable of carrying out a subset of the set of all tasks. A feasible solution to a scheduling problem is a mapping from tasks to machines over specified intervals of time, so that no machine has assigned to it more than one task at a time and each task is completed before starting any other task that follows it in the specified partial order.

The embodiments described herein are primarily concerned with the second step (i.e., the scheduling step). More specifically, the embodiments described herein relate to a set of combinatorial scheduling algorithms for three different scheduling problems that arise in PSPs. First, the production model in typical PSPs is formulated to create the scheduling algorithm. In particular, it is noted that print production workflows may often be viewed as a directed acyclic graph (DAG). In other words, there is a partial order on the set of operations that are needed to execute a print job in a typical PSP. Second, with this assumption in mind, the production process for a given PSP may be defined as a first set of N parallel machines followed by a second set of M machines in series (see, e.g., FIG. 2). It may be assumed that for each machine and print job there are two factors that may delay the print job. The first is the job processing time for the particular machine, and the second is the setup time needed to adjust the machine to be ready to process the print job. While the processing times are constants for a given print job and set of machines, the setup times primarily depend upon the last print job that was executed in a particular machine. Third, three scheduling algorithms are proposed for the considered model. For a given set of print jobs, all three algorithms may be used to minimize the time needed to execute all print jobs (i.e., the "makespan" for a group of print jobs). More specifically, by ignoring the setup times, the first algorithm is directed toward minimizing the makespan, the second algorithm considers only the setup times, and the third algorithm incorporates both the makespan and the setup times.

Turning now to the figures. FIG. 1 is an example of a workflow 10 of a typical PSP that may be controlled in accordance with present embodiments. The workflow 10 consists of two main groups of machines: printing machines 12 and finishing machines 14. In particular, as illustrated in FIG. 1, print jobs 16 enter the workflow 10 at a pre-printing node 18, at which point any given print job 16 may be directed to either a color printer 20 or a black/white printer 22 (i.e., the printing machines 12) for color printing or black/white printing of the print job 16, respectively. Once the print job 16 has been printed, the print job 18 enters a post-printing/pre-finishing node 24, at which point the print job 16 may be directed to one or more of the finishing machines 14, which as illustrated may include a collator 26 for collating the print job 16, a cutter 28 for cutting the print job 16 into particular page dimensions, and a binder 30 for binding the print job 16. None, one, two, or all of the finishing machines 14 may be utilized for any particular print job 16. In addition, the finishing machines 14 for a particular print job 16 may be performed in various orders. For example, as illustrated in FIG. 1, in certain embodiments, the print job 16 may be sent to a collator 26, a cutter 28, and a binder 30 in that particular order. In addition, as also illustrated in FIG. 1, in other embodiments, the print job 16 may be sent to a collator 26 and a binder 30 in that particular order. Once the print job 16 has completed processing through the finishing machines 14, it may exit the workflow 10 at a post-finishing node 32. It should be understood that a given PSP may include any number of color printers 20, black/white printers 22, collators 26, cutters 28, and binders 30. Indeed, as described above, embodiments described herein are directed toward the scheduling of print jobs 16 through these various PSP resources.

As described above, the workflow 10 of FIG. 1 may be characterized as a DAG, in which the printing machines 12 are usually used before the finishing machines 14. In addition, the finishing machines 14 are usually used in some particular order for a given print job 16. For example, cutting using the cutter 28 is usually done before binding using the binder 30. This acyclic connectivity between the finishing machines 14 is also characterized by "bypasses," which enable print jobs 16 to be forwarded to finishing machines 14 that may be more downstream than others. This means that a particular print job 16 may, for example, use the collator 26 and then the binder 30 while "jumping over" the cutter 28. Similarly, a given print job 16 may jump over the collator 26, and only use the cutter 28 and the binder 30. It is possible to omit these bypasses in a model of the workflow 10 by allowing the finishing machines 14 to process jobs at zero time. In that case, jobs can be "passed" at zero time through the unused machines instead of bypassing them. This, together with the fact that there may be more than two printing machines 12 in parallel and more than three finishing machines 14 in series, leads to the model described herein for print job production in PSPs, which includes N machines in parallel followed by M machines in series.

Figure 2:
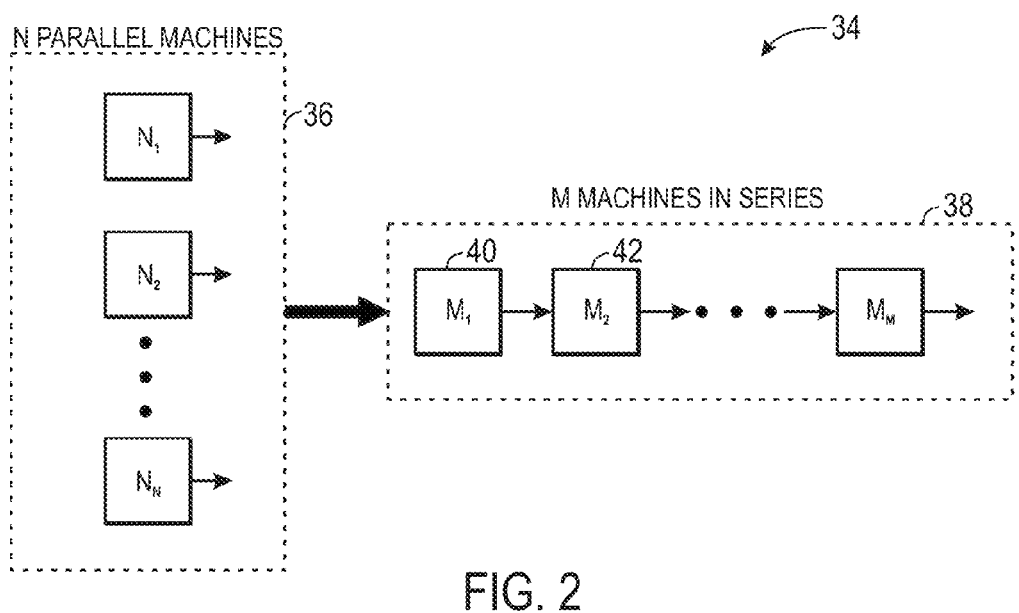
FIG. 2 is an example of a workflow of a PSP having a first group of N machines in parallel, followed by a second group of M machines in series, which may be controlled in accordance with present embodiments.

FIG. 2 is an example of a workflow 34 of a PSP that may be controlled in accordance with present embodiments. The PSP includes a first group 36 of N machines (e.g., the printing machines 12 of FIG. 1) in parallel, followed by a second group 38 of M machines (e.g., the finishing machines 14 of FIG. 1) in series. For each machine m ∈ M of the second group 38 and any particular print job j, there will be a processing time $T_m(j)$. Moreover, given a pair of print jobs $j_1$ and $j_2$, it may be assumed that each machine m ∈ M of the second group 38 has a setup time that reflects the transition between the print jobs $j_1$ and $j_2$. In this context, the solution may be restricted such that the queues for each machine m in the second group 38 operate according to the First In/First Out (FIFO) principle. This implies that the order (i.e. permutation) in which the print jobs $j_1$ and $j_2$ go through any particular machine m in the second group 38 is maintained throughout the system. As an objective function, the schedule makespan (i.e., defined as the completion time between the first print job 16 entering the system and the last print job 16 leaving the system) may be minimized. A minimum makespan usually implies a high utilization of the workflow 34.

With respect to two machines 40, 42 in series, it may be assumed that there are two print jobs 16, with the processing time of print job j on the first machine 40 denoted as $p_{1j}$, and the processing time of print job j on the second machine 42 denoted as $p_{2j}$. The print jobs 16 may be partitioned into two sets, with Set I containing all of the print jobs 16 having $p_{1j} < p_{2j}$, and Set II containing all of the print jobs 16 having $p_{1j} > p_{2j}$. In certain embodiments, the print jobs 16 having $p_{1j} = p_{2j}$ may be put in an arbitrary set (e.g., in either Set I or Set II). Set I and Set II may be used for scheduling to minimize the makespan. This method is commonly known as the Johnson Rule.

Figure 3:
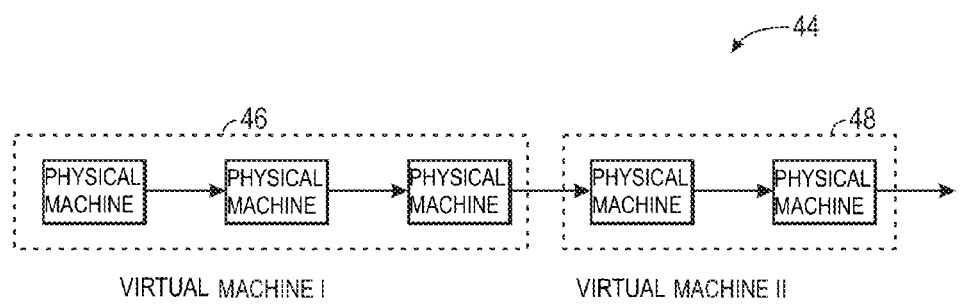
FIG. 3 is an example of a solution workflow having two virtual machines in series, with each virtual machine including one or more physical machines that may be controlled in accordance with present embodiments.

However, the Johnson Rule cannot be generalized to yield optimal scheduling for PSPs having more than two machines 40, 42. One approach for solving this problem for more than two machines 40, 42 is to define two virtual machines in series, with each virtual machine including one or more physical machines (e.g., such as the machines in the second group 38 of FIG. 2). For example. FIG. 3 is an example of a solution workflow 44 having two virtual machines 46, 48 in series, with each virtual machine 46, 48 including one or more physical machines that may be controlled in accordance with present embodiments.

It has been observed that the Johnson Rule generally prioritizes print jobs 16 according to the following rule: print jobs 16 with smaller processing times on upstream machines relative to downstream machines should be issued more towards the beginning of the schedule. This observation may be used to produce a cost function that prioritizes print jobs 16. Returning now to FIG. 2, it may be assumed that $T_j=(t_1, t_2, \ldots, t_{|M|})$ is a vector that represents the processing time of each machine in the second group 38 of M machines for print job j. The element $t_i$ in the vector represents the processing time for the $i^{th}$ machine in the series. As a first step, the points (1, $t_1$), (2, $t_2$), . . . , (|M|, $t_{|M|}$)∈ i×$t_i$ may be considered, and a corresponding best fit line may be determined using linear regression. The slope of the best fit line measures the relative length of the processing times on the upstream machines with the processing times on the downstream machines. Accordingly, the slope may be used to prioritize the print jobs 16. More specifically, print jobs 16 having larger slopes take higher priority for scheduling than print jobs 16 having smaller slopes.

Figure 4:
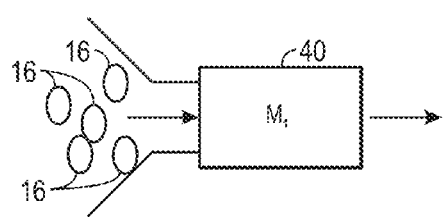
FIG. 4 illustrates a particular machine of the second group of machines of FIG. 2 with a plurality of print jobs queued up for the machine in accordance with present embodiments.

FIG. 4 illustrates a particular machine 40 of the second group 38 of machines of FIG. 2 with a plurality of print jobs 16 queued up for the machine 40 in accordance with present embodiments. The above solution ignores the fact that, in addition to the processing times, there is also time incurred to adjust the machine operation made for the next print job 16. As described above, this setup time depends on the last print job 16 that was executed on the machine 40. For a particular machine, minimizing the makespan (i.e., the total time to execute all print jobs 16) is analogous to what is known as the Traveling Salesman Problem, where a salesman has to visit a given number of cities, and the total distance traveled is minimized. Table 1 is an example of sequence-dependent setup times for a single machine with the first of two consecutive print jobs 16 listed in the left-hand column of Table 1, and the second of two consecutive print jobs 16 listed in the upper row of Table 2. The creation of Table 1 will be described in greater detail below.

TABLE 1

| Job | $j_1$ | $j_2$ | $j_3$ | $j_4$ |
|---|---|---|---|---|
| $j_1$ | 0 | 1 | 10 | 2 |
| $j_2$ | 1 | 0 | 4 | 3 |
| $j_3$ | 10 | 4 | 0 | 5 |
| $j_4$ | 2 | 3 | 5 | 0 |

Each entry in the table represents the time incurred by moving from print job $j_i$ to print job $j_k$. As with the Traveling Salesman Problem, the progression between all of the print jobs 16 must be determined such that their overall execution is minimized. The Traveling Salesman Problem is non-deterministic polynomial-time hard (NP-hard). Therefore, its equivalence to the task of scheduling the print jobs 16 for a single machine with given setup times is NP-hard as well. As such, solving the scheduling problem when arbitrary setup times are considered can become computationally intractable. Accordingly, more tractable special cases are described herein. For example, it is known that the setup times induced by cutters 28 can be significant. Therefore, further analysis of the setup times of cutters 28 enables a determination of whether the cutters 28 induce arbitrary setup times (i.e., implying the NP-hardness) or if the setup times of the cutters 28 are more specific and enable a more efficient solution to the problem. It should be understood that while the following example relates to cutters 28, similar analysis may be performed for other machines of the PSP.

Figure 5A:
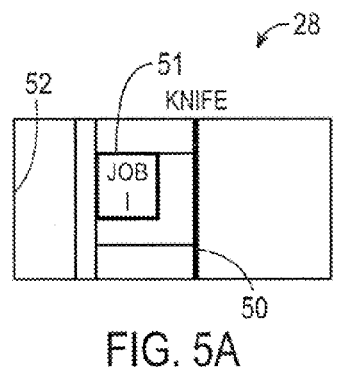
FIGS. 5A through 5I are a step-by-step illustration of two print jobs progressing through the cutting processes for a given cutter in accordance with present embodiments.
Figure 5B:
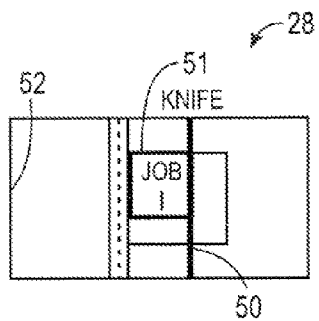
Figure 5C:
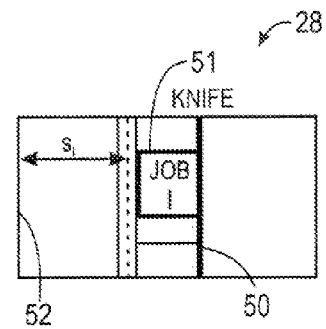

In order to further explore this issue, the problem may be formalized. More specifically, a step-by-step description of how the setup times between consecutive print jobs 16 is determined for cutters 28 will now be presented. For example, FIGS. 5A through 5I are a step-by-step illustration of two print jobs 16 (e.g., print job i and print job k) progressing through the cutting processes for a given cutter 28 in accordance with present embodiments. As such, FIGS. 5A through 5I illustrate the transition between two consecutive print jobs 16 (i.e., print jobs i and k). It may be assumed that in the first step, the print job i is placed into the cutter 28 (FIG. 5A). In the next step, a sheet 51 that contains the print job i is brought into contact with a knife 50 of the cutter 28 (FIG. 5B). In the next step, the knife 50 of the cutter 28 cuts the sheet 51 of the print job i (FIG. 5C). The time between placement of the print job i into the cutter 28 and the moment that the cutter 28 is ready for operation is the setup time. As illustrated in FIG. 5C, in this instance, the setup time for print job i is the time required to move the sheet 51 of the print job i a distance of $s_i$ from a fixed point (e.g., a front edge 52 of the cutter 28).

Figure 5D:
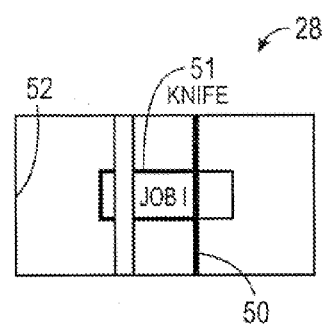
Figure 5E:
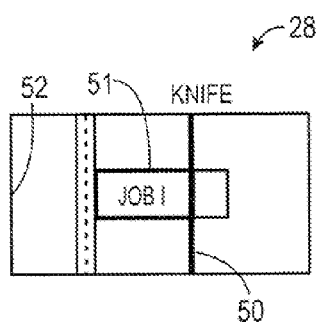
Figure 5F:
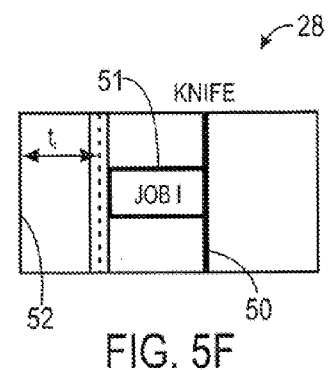
Figure 5G:
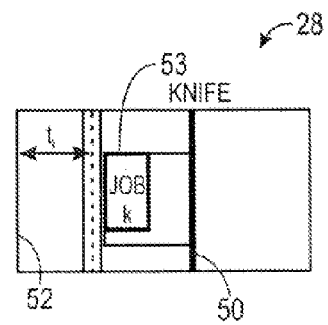

Next, the print job i may be rotated on the cutter 28, and the operations of FIGS. 5A through 5C may be repeated. For example, in the next step, the print job i may be rotated 90 degrees (e.g., in a clockwise direction, or in a counterclockwise direction, as illustrated in FIG. 5D) on the cutter 28. In the next step, the sheet 51 that contains the print job i may again be brought into contact with the knife 50 of the cutter 28 (FIG. 5E). In the next step, the knife 50 of the cutter 28 again cuts the sheet 51 of the print job i (FIG. 5F). As a result, after being rotated in FIG. 5D, the sheet 51 of the print job i is moved a distance $t_i$ from the fixed point 52.

Figure 5H:
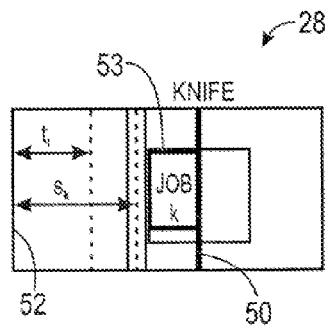
Figure 5I:
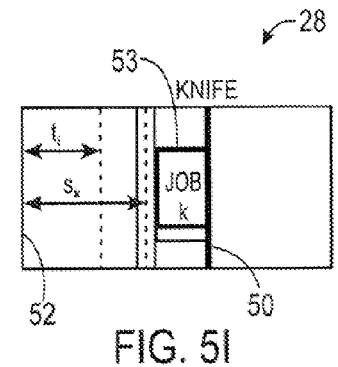

Finally, upon arrival of the print job k, the print job k has to be brought into contact with the knife 50 of the cutter 28. For example, in the next step, the print job k is placed into the cutter 28 (FIG. 5G), in the next step, a sheet 53 that contains the print job k is brought into contact with the knife 50 of the cutter 28 (FIG. 5H). In the next step, the knife 50 of the cutter 28 cuts the sheet 53 of the print job k (FIG. 5I). Again, the time between the placement of the print job k into the cutter 28 and the moment that the cutter 28 is ready for operation is the setup time. As illustrated in FIGS. 5H and 5I, in this instance, the setup time for print job k is the time required to move the sheet 53 of the print job k a distance of $s_k$ from the fixed point 52.

As such, for each print job 16, we have at least two associated parameters $s_k$ and $t_i$. After the completion of print job i, the cutter 28 is left at state $t_i$ (FIG. 5C). To be able to start print job k, the cutter 28 has to be brought to state $s_k$ (FIGS. 5H and 5I). Therefore, for any two given print jobs 16, the setup times $T_{setup}$ between the two print jobs 16 (e.g., $j_i$ and $j_k$) may be defined as proportional to the difference of $s_k$ and $t_i$ as follows:

$$T_{setup}=(j_i,j_k) \propto |s_k-t_i|$$

It may be further assumed that we have four print jobs 16 (i.e., $j_1, j_2, j_3$, and $j_4$), and that the setup times between any two consecutive print jobs 16 is shown in Table 2, with the first of the two consecutive print jobs 16 listed in the left-hand column of Table 2, and the second of the two consecutive print jobs 16 listed in the upper row of Table 2.

TABLE 2

| Job | $j_1$ | $j_2$ | $j_3$ | $j_4$ |
|---|---|---|---|---|
| $j_1$ | 0 | $|s_2-t_1|$ | $|s_3-t_1|$ | $|s_4-t_1|$ |
| $j_2$ | $|s_1-t_2|$ | 0 | $|s_3-t_2|$ | $|s_4-t_2|$ |
| $j_3$ | $|s_1-t_3|$ | $|s_2-t_3|$ | 0 | $|s_4-t_3|$ |
| $j_4$ | $|s_1-t_4|$ | $|s_2-t_4|$ | $|s_3-t_4|$ | 0 |

The equations shown in Table 2 may be used to determine the sequence-dependent setup times for a single machine shown above in Table 1. It should be noted that the number of variables in Table 2 is eight (two for each of the four print jobs 16), whereas the number of equations is twelve. Thus, Table 2 proves that cutters 28 do not induce arbitrary setup structures, and therefore the scheduling for the case of cutters 28 is not equivalent to the Traveling Salesman Problem that was described above. Therefore, the problem may not be NP-hard anymore using similar analyses for all machines of the PSP. Again, similar analysis can be performed for collators 26, binders 30, and other types of machines.

As such, a linear program may be used to solve the scheduling problem. To that end, integer programming may be provided to solve the scheduling problem optimally, but not in polynomial time. Then, the integer programming may be transformed into linear programming that is solvable in polynomial time. More specifically, it may be assumed that $x_{i,k}$ represents an indicator that is equal to 1 if and only if print job i is followed by print job k, and is equal to 0 otherwise. Then, the integer programming representing an optimal solution may be shown as:

$$\text{Minimize} \sum_{i,k \in J} x_{i,k} \cdot |s_k - t_i|$$

such that $$\sum_{k \in J} x_{i,k} = 1 \ \forall \ i \in J$$

$$x_{i,k} \in \{0, 1\} \ \forall \ i, k \in J$$

In order to transform this integer programming into linear programming, the integer constraints may be relaxed (for the indicators), and the linear programming representing the optimal solution may be shown as:

$$\text{Minimize} \sum_{i,k \in J} x_{i,k} \cdot |s_k - t_i|$$

such that $$\sum_{k \in J} x_{i,k} = 1 \ \forall \ i \in J$$

$$0 \le x_{i,k} \le 1 \ \forall \ i, k \in j$$

To that end, an integral matrix may be called totally unimodular if each of its square sub-matrices has a determinant of 0, +1, or −1. Therefore, it may be shown that the constraint matrix is totally unimodular. When the constraint matrix is of the later type (i.e., associated with the linear programming equations presented above), it holds that the computation achieved by a linear program solver has at least one integral solution. In other words, there exists an integer solution that can be computed in a polynomial time that solves the integer programming equations presented above. Hence, the problem of minimizing the makespan for all print jobs 16 with setup times induced by cutters 28 may be solved by solving (in polynomial time) the linear programming equations presented above. Again, similar analysis can be performed for collators 26, binders 30, and other types of machines.

Returning now to FIG. 4, in certain situations, $s_k$ may be equal to t for each print job 16. In this unique scenario, when a print job 16 is admitted to a machine 40, the machine 40 may need to be adjusted before starting execution of the print job 16 on the machine 40. However, unlike general cases (e.g., the cutter 28 described above with respect to FIGS. 5A through 5I), the settings of the machine 40 remain unchanged throughout execution of the print jobs 16. A special algorithm may be provided to incorporate these unique setup time structures with the previous strategy described above.

Figure 6:
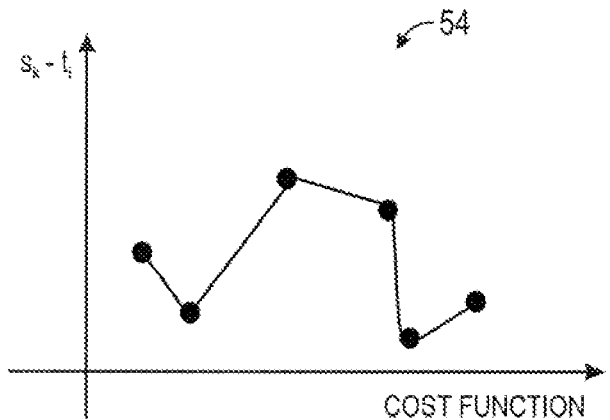
FIG. 6 is an example of a graph of setup times versus cost functions (e.g., processing times) for a particular machine in accordance with present embodiments.

More specifically, the setup times may be combined with the previous scheduling approach using the Euclidean Traveling Salesman Problem. When setup times are to be minimized, the values for $s_k$ minus t (i.e., the setup times) as shown in Table 2 above may be sorted. On the other hand, when scheduling a particular print job 16 without consideration of setup times, the slopes of the best fit lines described above (i.e., the cost functions) may be sorted. A general objective is to sort based on both of these parameters. To that end, two axes may be considered. For example, FIG. 6 is an example of a graph 54 of setup times (e.g., $s_k$ minus $t_i$) versus cost functions (e.g., processing times) for a particular machine 40 in accordance with present embodiments. As illustrated in FIG. 6, the setup times ($s_k$ minus $t_i$) may be shown on the y-axis, and the cost functions (e.g., processing times) may be shown on the x-axis. Therefore, every print job 16 is represented by two numbers on the graph 54. Then, the solution to the Traveling Salesman Problem may be used to find a minimal makespan between all print jobs 16. By definition, the minimal makespan minimizes the transition between different print jobs 16. Hence, since sorting minimizes the (single dimensional) transitions between different print jobs 16, it generalizes the concept of sorting.

Figure 7:
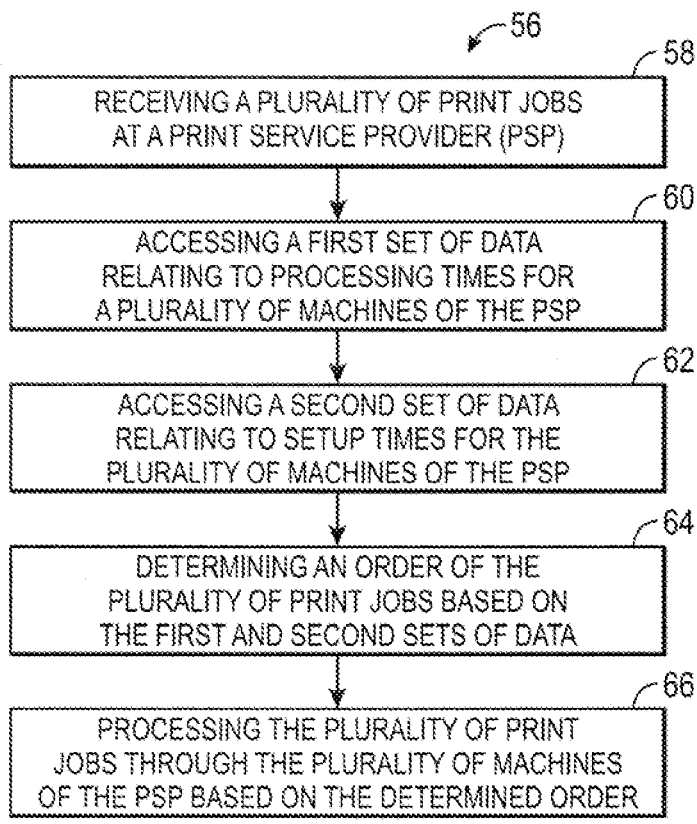
FIG. 7 is an example flow chart of a method for scheduling print jobs through the plurality of machines of the PSP of FIG. 1 in accordance with present embodiments.

FIG. 7 is an example flow chart 56 of a method for scheduling print jobs 16 through the plurality of machines (e.g., the color printers 20, the black/white printers 22, the collators 26, the cutters 28, the binders 30, and so forth) of the PSP of FIG. 1 in accordance with present embodiments. It should be noted that in other embodiments, methods may include scheduling different machines operations. At step 58, a plurality of print jobs 16 may be received at the PSP. At step 60, a first set of data relating to processing times for the plurality of machines (e.g., the color printers 20, the black/white printers 22, the collators 26, the cutters 28, the binders 30, and so forth) may be accessed. The first set of data relating to processing times may include processing times for specific print jobs 16 having particular characteristics (e.g., sheet sizes and dimensions, sheet layouts and orientations, number of sheets, type of binding, and so forth) or may include processing times for types of print jobs 16 having the particular characteristics. In other words, certain types of print jobs 16 may share similar processing times based on the particular print job characteristics, even though the specific characteristics for a given print job 16 may vary slightly. As such, in certain embodiments, both real-time and historical data relating to both specific print jobs 16 and types of print jobs 16 may be received and/or stored in memory, and may be used as part of the first set of data. In general, step 60 may be performed without human intervention via a print job scheduling system, which is described in greater detail below.

At step 62, a second set of data relating to setup times for the plurality of machines (e.g., the color printers 20, the black/white printers 22, the collators 26, the cutters 28, the binders 30, and so forth) may be accessed. More specifically, as described above (and shown in Tables 1 and 2), the second set of data may include setup times between sets of two of the plurality of print jobs 16. As with the first set of data, the second set of data relating to setup times may include setup times for specific sets of two print jobs 16 having particular characteristics (e.g., sheet sizes and dimensions, sheet layouts and orientations, number of sheets, type of binding, and so forth), or may include setup times for sets of two types of print jobs 16 having the particular characteristics. In other words, again, certain sets of types of print jobs 16 may share similar setup times based on the particular print job characteristics, even though the specific characteristics for a given set of print jobs 16 may vary slightly. As such, in certain embodiments, both real-time and historical data relating to both specific sets of two print jobs 16 and sets of two types of print jobs 16 may be received and/or stored in memory, and may be used as part of the second set of data. Again, in general, step 62 may be performed without human intervention via a print job scheduling system, which is described in greater detail below.

At step 64, an order of the plurality of print jobs 16 (e.g., an order in which the plurality of print jobs 16 may be processed) may be determined based on the first and second sets of data, which are accessed in steps 60 and 62. As described above, in certain embodiments, determining the order of the plurality of print jobs 16 may include determining best fit linear regressions of processing times for each of the plurality of machines. In addition, in certain embodiments, determining the order of the plurality of print jobs 16 may include sorting slopes of the best fit linear regressions of the processing times for each of the plurality of machines. In addition, in certain embodiments, determining the order of the plurality of print jobs 16 may include sorting the setup times between sets of two of the plurality of print jobs 16 for the plurality of machines. Moreover, in certain embodiments, determining the order of the plurality of print jobs 16 may include the combination of sorting slopes of the best fit linear regressions of the processing times for each of the plurality of machines, sorting the setup times between sets of two of the plurality of print jobs 16 for the plurality of machines, and comparing the sorted slopes of the best fit linear regressions of processing times for each of the plurality of machines and the sorted setup times between sets of two of the plurality of print jobs 16 for the plurality of machines. Again, in general, step 64 may be performed without human intervention via a print job scheduling system, which is described in greater detail below.

In step 66, the plurality of print jobs 16 may be processed through the plurality of machines (e.g., the color printers 20, the black/white printers 22, the collators 26, the cutters 28, the binders 30, and so forth) of the PSP based on the determined order. In other words, the processing of the plurality of print jobs 16 determined in step 64 may be carried out in the determined order. In addition, in certain embodiments, the determined order of the plurality of print jobs 16 may first be displayed to a human operator via a display of a print job scheduling system, which is described in greater detail below. More specifically, the determined order (or one or more optional determined orders) may be presented to the human operator, such that the human operator may approve and/or select a determined order to be performed.

Figure 8:
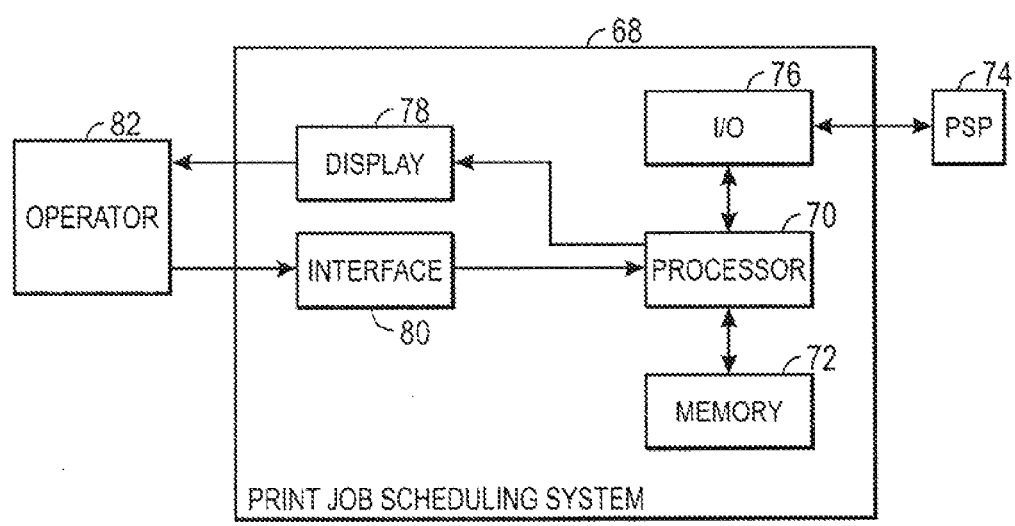
FIG. 8 is a block flow diagram of an example of the print job scheduling system, which may be used to carry out many of the method steps presented in FIG. 7 in accordance with present embodiments.

As described above, many of the steps (e.g., steps 60, 62, and 64) of the scheduling method presented in FIG. 7 may be performed without human intervention. More specifically, a print job scheduling system 68 may be used to access the first and second sets of data relating to the plurality of print jobs 16 having specific characteristics, and determine an order of execution for the plurality of print jobs 16 based on the algorithms described herein, which take the specific characteristics of the print jobs 16 into consideration. FIG. 8 is a block flow diagram of an example of the print job scheduling system 68, which may be used to carry out many of the method steps presented in FIG. 7 in accordance with present embodiments. As illustrated, the print job scheduling system 68 may include a processor 70, which may read from and write to a memory 72. The memory 72 may be a non-transitory computer-readable medium (e.g., a hard drive, flash drive, random access memory (RAM), compact disc (CD), and so forth) having computer instructions encoded thereon, which are configured to perform many of the method steps (e.g., steps 60, 62, and 64) presented in FIG. 7 and described throughout the present disclosure. Indeed, the memory 72 may store instructions and code for performing the methods and algorithms set forth herein. The processor 70 is configured to perform the computer instructions encoded on the memory 72. In addition, as described above, the memory 72 may store real-time and/or historical data relating to the processing times and setup times described above. Such data may then be utilized in scheduling subsequent processes.

In addition, in certain embodiments, data (e.g., the first and second sets of data described above) may be received from the PSP 74 via input/output (I/O) interfaces 76 that are connected to the machines (e.g., the color printers 20, the black/white printers 22, the collators 26, the cutters 28, the binders 30, and so forth) of the PSP 74. In addition, in certain embodiments, the print job scheduling system 68 may include a display 78 and an interface 80 for displaying information to a human operator 82 of the PSP 74 and receiving inputs from the operator 82, respectively. For example, as described above, in certain embodiments, the determined order of a plurality of print jobs 16 may be displayed to the operator 82 via the display 78, such that the operator 82 may approve and/or select the determined order prior to execution of the print jobs 16 according to the determined order. Further, the operator 82 may interact to provide input throughout the processes of determining the order of execution of the plurality of print jobs 16, and executing the plurality of print jobs 16.

What is claimed is:

1. A method, comprising:
   (a) receiving a plurality of print jobs at a print service provider (PSP);
   (b) accessing a first set of data relating to processing times for a plurality of machines of the PSP in accordance with characteristics of the plurality of print jobs;
   (c) accessing a second set of data relating to setup times for the plurality of machines of the PSP in accordance with characteristics of the plurality of print jobs; and
   (d) determining an order of processing for the plurality of print jobs based on the first and second sets of data, by one of:
   determining best fit linear regressions of processing times for each of the plurality of machines;
   sorting setup times between sets of two of the plurality of print jobs for the plurality of machines.

2. The method of claim 1, comprising processing the plurality of print jobs through the plurality of machines of the PSP based on the determined order of processing.

3. The method of claim 1, wherein determining the order of the plurality of print jobs comprises sorting slopes of the best fit linear regressions of the processing times for each of the plurality of machines.

4. The method of claim 1, wherein accessing the second set of data comprises accessing the setup times between sets of two of the plurality of print jobs.

5. The method of claim 1, comprising displaying the determined order of the plurality of print jobs to a human operator of the PSP via a display.

6. The method of claim 1, wherein steps (a)-(d) are performed in the recited order.

7. The method of claim 1, wherein steps (b)-(d) are performed without human intervention.

8. A non-transitory computer-readable medium having computer instructions encoded thereon, wherein the computer instructions comprise instructions for:
   accessing a first set of data relating to processing times for a plurality of machines of a print service provider (PSP), wherein the processing times relate to specific print jobs or to types of print jobs sharing print job characteristics;

accessing a second set of data relating to setup times for the plurality of machines of the PSP, wherein the setup times relate to specific sets of two print jobs or sets of two types of print jobs sharing print job characteristics; and determining an order of processing for a plurality of print jobs received at the PSP based on the first and second sets of data, by sorting the setup times between sets of two of the plurality of print jobs for the plurality of machines.

9. The non-transitory computer-readable medium of claim 8, wherein the computer instructions for determining the order of the plurality of print jobs comprise instructions for determining best fit linear regressions of processing times for each of the plurality of machines.

10. The non-transitory computer-readable medium of claim 9, wherein the computer instructions for determining the order of the plurality of print jobs comprise instructions for sorting slopes of the best fit linear regressions of the processing times for each of the plurality of machines.

11. The non-transitory computer-readable medium of claim 8, wherein the computer instructions comprise instructions for displaying the determined order of the plurality of print jobs to a human operator of the PSP via a display.

12. A print job scheduling system configured to:

access a first set of data relating to processing times for a plurality of machines of a print service provider (PSP), wherein the processing times relate to specific print jobs or types of print jobs sharing print job characteristics;

access a second set of data relating to setup times for the plurality of machines of the PSP, wherein the setup times relate to specific sets of two print jobs or sets of two types of print jobs sharing print job characteristics; and determine an order of processing for a plurality of print jobs based on the first and second sets of data, by one of:
  determining best fit linear regressions of processing times for each of the plurality of machines;
  sorting the setup times between sets of two of the plurality of print jobs for the plurality of machines.

* * * * *